(12) United States Patent
Takao et al.

(10) Patent No.: US 8,104,794 B2
(45) Date of Patent: Jan. 31, 2012

(54) SEAT BELT RETRACTOR, SEAT BELT APPARATUS, SEAT BELT WINDING METHOD, COMPUTER PROGRAM, AND SEAT BELT SYSTEM

(75) Inventors: Masato Takao, Tokyo (JP); Koji Tanaka, Tokyo (JP)

(73) Assignee: Takata Corporation, Tokyo (JP)

( * ) Notice: Subject to any disclaimer, the term of this patent is extended or adjusted under 35 U.S.C. 154(b) by 316 days.

(21) Appl. No.: 12/311,051

(22) PCT Filed: Nov. 22, 2007

(86) PCT No.: PCT/JP2007/072695
§ 371 (c)(1),
(2), (4) Date: Sep. 15, 2009

(87) PCT Pub. No.: WO2008/062884
PCT Pub. Date: May 29, 2008

(65) Prior Publication Data
US 2010/0007191 A1    Jan. 14, 2010

(30) Foreign Application Priority Data
Nov. 24, 2006  (JP) .................................. 2006-317730

(51) Int. Cl.
*B60R 22/34*   (2006.01)
(52) U.S. Cl. ........................................ 280/807; 297/475
(58) Field of Classification Search .................. 280/807; 297/475, 477; 242/373
See application file for complete search history.

(56) References Cited

U.S. PATENT DOCUMENTS
6,827,308 B2    12/2004  Fujii et al.
7,431,119 B2 *  10/2008  Tanaka ........................... 180/268
(Continued)

FOREIGN PATENT DOCUMENTS
EP          1 122 136 A2    8/2001
(Continued)

OTHER PUBLICATIONS
Communication (Supplementary EP Search Report) in EP Appln No. 07 83 2423 dated Mar. 22, 2011.

*Primary Examiner* — Faye M. Fleming
(74) *Attorney, Agent, or Firm* — Foley & Lardner LLP

(57) ABSTRACT

A seat belt retractor (1) is provided which comprises a rotation sensor (8) for detecting the withdrawn amount of a seat belt, a control amount setting unit for setting a first control amount for winding up the seat belt (3) and a second control amount to which the amount reaches after the first control amount according to the winding of the seat belt (3), an electric motor (6) having a two-stage winding speed composed of at least a high speed and a low speed as the speed winding the seat belt (3), and a winding speed adjusting unit for setting the winding speed of the electric motor (6) to the high speed between the time when the electric motor (6) starts the winding of the seat belt (3) and the time when the amount reaches the first control amount, setting the winding speed of the electric motor to the low speed when the amount exceeds the first control amount, and stopping the winding action of the seat belt (3) after the amount exceeds the second control amount, thereby quickly accommodating the seat belt (3) regardless of the body size of the occupant and preventing a seat belt fixture (sic) (17) from strongly hitting a pillar or the like.

15 Claims, 11 Drawing Sheets

U.S. PATENT DOCUMENTS

| | | | |
|---|---|---|---|
| 7,533,903 B2 * | 5/2009 | Takao et al. | 280/807 |
| 7,753,158 B2 * | 7/2010 | Takao et al. | 180/268 |
| 7,836,994 B2 * | 11/2010 | Tanaka | 180/268 |
| 7,946,375 B2 * | 5/2011 | Tanaka | 180/268 |
| 2003/0024625 A1 | 2/2003 | McAmish et al. | |
| 2003/0148694 A1 | 8/2003 | Ghiam | |
| 2003/0181120 A1 | 9/2003 | Wu et al. | |
| 2004/0122396 A1 | 6/2004 | Maldonado et al. | |
| 2005/0209755 A1 | 9/2005 | Sugiura | |
| 2006/0220368 A1 | 10/2006 | Takao et al. | |

FOREIGN PATENT DOCUMENTS

| | | |
|---|---|---|
| EP | 1 645 478 A1 | 4/2006 |
| GB | 2286558 A1 | 8/1995 |
| JP | 59-227540 | 12/1984 |
| JP | 3-552 | 1/1991 |
| JP | 8-40204 | 2/1996 |
| JP | 2001-63522 | 3/2001 |
| JP | 2001-225720 | 8/2001 |
| JP | 2001-334913 | 12/2001 |
| JP | 2005-14658 | 1/2005 |
| JP | 3781884 | 3/2006 |
| JP | 2006-88868 | 4/2006 |
| JP | 2006-199116 | 8/2006 |
| JP | 2006-282015 | 10/2006 |
| WO | WO 98/43811 A1 | 10/1998 |

* cited by examiner

SEAT BELT RETRACTOR, SEAT BELT APPARATUS, SEAT BELT WINDING METHOD, COMPUTER PROGRAM, AND SEAT BELT SYSTEM

TECHNICAL FIELD

The present invention relates to a seat belt retractor having a function of winding up a seat belt by means of a motor, a seat belt apparatus, a seat belt winding method, a computer program, and a seat belt system.

BACKGROUND ART

A seat belt apparatus installed in an automobile or the like restrains an occupant with a seat belt so as to prevent the occupant from jumping out of a seat in the event of a vehicle collision or the like. The seat belt apparatus comprises a seat belt retractor for winding up the seat belt. The seat belt retractor comprises a spool and a locking member. When the seat belt apparatus is not used, the seat belt is wound onto the spool. The seat belt is withdrawn to be worn by the occupant. In the event of a vehicle collision or the like, the locking member locks the spool against rotation in the belt withdrawing direction, thereby preventing the withdrawal of the seat belt. Therefore, the seat belt restrains the occupant in the event of an emergency.

The seat belt retractor is required to wind up an excessively withdrawn portion of the seat belt to fit the seat belt to a human body. On the other hand, it is desired not to apply feeling of tightness to the occupant when normally wearing the seat belt. In addition, the seat belt retractor is desired to wind up the seat belt until the seat belt is completely accommodated in a housing when the occupant does not wear the seat belt.

However, a conventional seat belt retractor using biasing force of a spring does not meet these desires. Specifically, if a weak spring is used for reducing the feeling of tightness of the occupant, the force of winding the belt is poor so that it takes much time to accommodate the seat belt into the housing. On the other hand, if a strong spring is used for increasing the force of winding the seat belt, the feeling of tightness of the occupant is unfortunately increased.

Seat belt retractors capable of solving this problem have been disclosed in Patent documents 1 and 2.

A seat belt retractor disclosed in Patent document 1 comprises a main spring and a sub spring. For normally winding up the belt, sufficient winding force is ensured by combined biasing force of the both springs. When the occupant wears the seat belt, the seat belt is held to fit the body of the occupant by the biasing force of the main spring. In this arrangement, however, since the winding force is given by the biasing force of the springs, the winding force is strong when the withdrawn amount of the seat belt is large and the winding force is weak when the withdrawn amount of the seat belt is small. Accordingly, in case of a well-built occupant, the feeling of tightness by the seat belt tends to be strong. Furthermore, the winding speed of the seat belt depends on the body size of the occupant.

A seat belt retractor disclosed in Patent document 2 comprises a spring and a motor. For normally winding up the belt, winding force is ensured mainly by the motor. When the occupant wears the seat belt, the seat belt is held to fit the body of the occupant by the biasing force of the spring.

In this arrangement, however, the winding speed is not controlled during the winding of the seat spring (sic). Accordingly, if the winding speed is high, a belt tongue may strongly hit a pillar of the like. Since the withdrawn amount of the seat belt varies widely between an occupant having a large body size and an occupant having a small body size, the time took for winding also varies.

Further, disclosed in Patent document 3 is a retractor for a seat belt which is capable of winding up the entire amount of the seat belt even when the seat belt is caught by something during a seat belt winding. When a time from the start of winding the seat belt by a motor to the first stop is equal to or exceeds a first predetermined value, the retractor maintains a state that the winding is stopped. When a time from the start of winding the seat belt by the motor to the first stop is smaller than the first predetermined value, the winding action is halted until a total time of winding operation carried by the motor reaches a second predetermined value (sic).

Patent document 1: JP-A-H03-552
Patent document 2: JP-A-2001-225720
Patent document 3: JP-A-2006-88868

DISCLOSURE OF THE INVENTION

Problems to be Solved by the Invention

In the seat belt retractor disclosed in Patent document 3, the winding speed is not controlled. Therefore, the seat belt retractor may not cope with the situation that the withdrawn amount of the seat belt varies with differences in body size among the occupants. For example, when the occupant has a large body size so that the withdrawn amount of the seat belt is large, it takes a long time for winding, i.e. takes a longer time until the winding is completed as compared to the time for winding which is preset as standard.

The same problem may occur also when the withdrawn amount of the seat belt varies for a reason other than the body size.

The present invention was made under the aforementioned situations and it is an object of the present invention to provide a seat belt retractor, a seat belt apparatus, a seat belt winding method, a computer program of the same, and a seat belt system, capable of quickly accommodating a seat belt regardless of differences in body size among occupants and preventing a seat belt fixture (sic) from strongly hitting a pillar or the like.

Means for Solving the Problems

To achieve the aforementioned object, a seat belt retractor according to a first aspect of the present invention is characterized by comprising:

a body size index detection unit for detecting an index indicating the body size of an occupant;

a reference value setting unit for setting a first reference value of a predetermined parameter, which varies according to the winding of a seat belt, based on the index detected by said body size index detection unit;

a winding mechanism for winding said seat belt; and a winding speed adjusting unit which sets the winding speed of said winding mechanism to a first speed between the time when said winding mechanism starts winding of said seat belt and the time when said predetermined parameter reaches said first reference value, and sets the winding speed of said winding mechanism to a second speed slower than said first speed after said predetermined parameter reaches said first reference value.

For example, said body size index detection unit detects the withdrawn amount of said seat belt from the seat belt retractor;

said predetermined parameter is the withdrawn amount of said seat belt;

said reference value setting unit sets a first withdrawn amount of said seat belt as said first reference value; and said winding speed adjusting unit sets said winding speed of said winding mechanism to said first speed between the time when said winding mechanism starts the winding of said seat belt and the time when said withdrawn amount of said seat belt reaches said first withdrawn amount, and sets said winding speed of said winding mechanism to said second speed when said withdrawn amount reaches the said first withdrawn amount.

For example, said reference value setting unit sets said first reference value and a second reference value corresponding to a case where the winding amount is larger than the winding amount for said first reference value, and said winding speed adjusting unit sets said winding speed of said winding mechanism to said first speed between the time when said winding mechanism starts the winding of said seat belt and the time when said predetermined parameter reaches said first reference value, sets said winding speed of said winding mechanism to said second speed lower than said first speed when said predetermined parameter reaches the said first reference value, and stops the winding by said winding mechanism after said predetermined parameter reaches said second reference value.

For example, said reference value setting unit further sets, based on the index detected by said body size index detection unit, a second reference value where said predetermined parameter reaches after said first reference value according to the winding of said seat belt progresses, said winding speed adjusting unit sets said winding speed of said winding mechanism to said first speed between the time when said winding mechanism starts the winding of said seat belt and the time when said predetermined parameter reaches said first reference value, sets said winding speed of said winding mechanism to said second speed when said predetermined parameter exceeds the said first reference value, and stops the winding by said winding mechanism after said predetermined parameter reaches said second reference value.

For example, said body size index detection unit detects the withdrawn amount of said seat belt from the seat belt retractor, said predetermined parameter is the withdrawn amount of said seat belt, said reference value setting unit sets a first withdrawn amount of said seat belt as the first reference value and sets a second withdrawn amount, which is smaller than said first withdrawn amount, as the second reference value, said winding speed adjusting unit sets the winding speed of said winding mechanism to said first speed between the time when said winding mechanism starts the winding of said seat belt and the time when the withdrawn amount of said seat belt reaches said first withdrawn amount, sets the winding speed of said winding mechanism to said second speed when said withdrawn amount becomes equal to or lower than said first withdrawn amount, and stops the winding action of said seat belt when said withdrawn amount becomes equal to or lower than said second withdrawn amount.

For example, said body size index detection unit detects the withdrawn amount of said seat belt at least at two stages corresponding to said first withdrawn amount and said second withdrawn amount.

For example, said body size index detection unit detects continuously the withdrawn amount of said seat belt in proportion to the withdrawn amount.

For example, said winding mechanism has continuously or stepwisely variable winding speed, and said winding speed adjusting unit continuously or stepwisely reducing the winding speed according to the withdrawn amount when the withdrawn amount of said seat belt becomes equal to or lower than said first withdrawn amount.

For example, said reference value setting unit obtains the withdrawn amount of the seat belt based on said index and sets a first winding time and a second winding time longer than the first winding time according to the obtained withdrawn amount, and said winding speed adjusting unit sets the winding speed of said winding mechanism to the first speed between the time when said winding mechanism starts the winding of said seat belt and the time when said first winding time elapses, sets the winding speed of said winding mechanism to said second speed at a point when said winding time elapses, and stop the winding action of said seat belt after said second winding time elapses.

For example, said body size index detection unit detects the weight of the occupant and/or the surface profile of the occupant and/or the seat position, and said reference value setting unit estimates the withdrawn amount of the seat belt based on said weight and/or the surface profile of the occupant and/or the seat position.

To achieve the aforementioned object, a seat belt apparatus according to a second aspect of the present invention is characterized by comprising:

a fixing member for fixing an end of a seat belt;

a seat belt retractor which is connected to the other end of said seat belt to wind up said seat belt;

an engaging member through which said seat belt is inserted and is slidably supported;

a buckle which is disposed on a side opposite to said fixing member relative to a seat and is engaged with said engaging member; and a guide member which is located above said fixing member, through which said seat belt is inserted, and which supports slidably said seat belt, wherein said seat belt retractor comprises:

a body size index detection unit for detecting an index indicating the body size of an occupant;

a reference value setting unit for setting a first reference value of a predetermined parameter, which varies according to the winding of said seat belt, based on the index detected by said body size index detection unit;

a winding mechanism for winding said seat belt; and a winding speed adjusting unit which sets the winding speed of said winding mechanism to a first speed between the time when said winding mechanism starts winding of said seat belt and the time when said predetermined parameter reaches said first reference value, and sets the winding speed of said winding mechanism to a second speed slower than said first speed after said predetermined parameter reaches said first reference value.

To achieve the aforementioned object, a seat belt winding method according to a third aspect of the present invention is characterized by comprising:

detecting the withdrawn amount of a seat belt when an occupant wears the seat belt;

setting a predetermined reference value based on the detected withdrawn amount; and winding said seat belt at a first speed until said withdrawn amount reaches a reference value, and winding said seat belt at a second speed lower than said first speed after said withdrawn amount reaches the reference value according to the winding of said seat belt.

For example, the seat belt winding method comprises:

further setting a second reference value lower than the first reference value according to the withdrawn amount of the seat belt when the occupant wears the seat belt, and setting the winding speed of a winding mechanism between the time when said winding mechanism starts the winding of said seat belt and the time when the withdrawn amount reaches said first reference value, setting the winding speed to said second speed when the withdrawn amount reaches said first reference value, and stopping the winding when the withdrawn amount becomes lower than said second reference value.

To achieve the aforementioned object, a computer program according to a fourth aspect of the present invention is characterized by making a computer, for controlling a winding mechanism for winding a seat belt, carry out:

a step of taking in an index indicating the body size of an occupant to set a reference value of a predetermined parameter which varies according to the winding of said seat belt based on the index, a step of controlling said winding mechanism to wind up said seat belt at a first speed until said predetermined parameter varying according to the winding of said seat belt reaches said reference value obtained based on the detected index, and a step of controlling said winding mechanism to wind up said seat belt at a second speed lower than said first speed after said predetermined parameter reaches said reference value.

To achieve the aforementioned object, a seat belt system according to a fifth aspect of the present invention is characterized by comprising:

a fixing member for fixing an end of a seat belt;

a seat belt winding mechanism which is connected to the other end of said seat belt to wind up said seat belt;

a driving device for driving said seat belt winding mechanism to wind up said seat belt;

an engaging member through which said seat belt is inserted and is slidably supported;

a buckle which is disposed on a side opposite to said fixing member relative to a seat and is engaged with said engaging member;

a guide member which is located above said fixing member, through which said seat belt is inserted, and which supports slidably said seat belt, and a computer for inputting an index indicating the body size of an occupant, sets a reference value of a predetermined parameter, which varies according to the winding of said seat belt, based on the index, controlling said driving device to wind up said seat belt at a first speed until said predetermined parameter which varies according to the winding of said seat belt reaches said reference value which was set based on the detected index, and controlling said driving device to wind up said seat belt at a second speed lower than said first speed after said predetermined parameter reaches said reference value.

Effect of the Invention

According to the present invention, it is possible to quickly accommodate a seat belt regardless of differences in body size among occupants and prevent a seat belt fixture (sic) from strongly hitting a pillar or the like.

Figure 1:
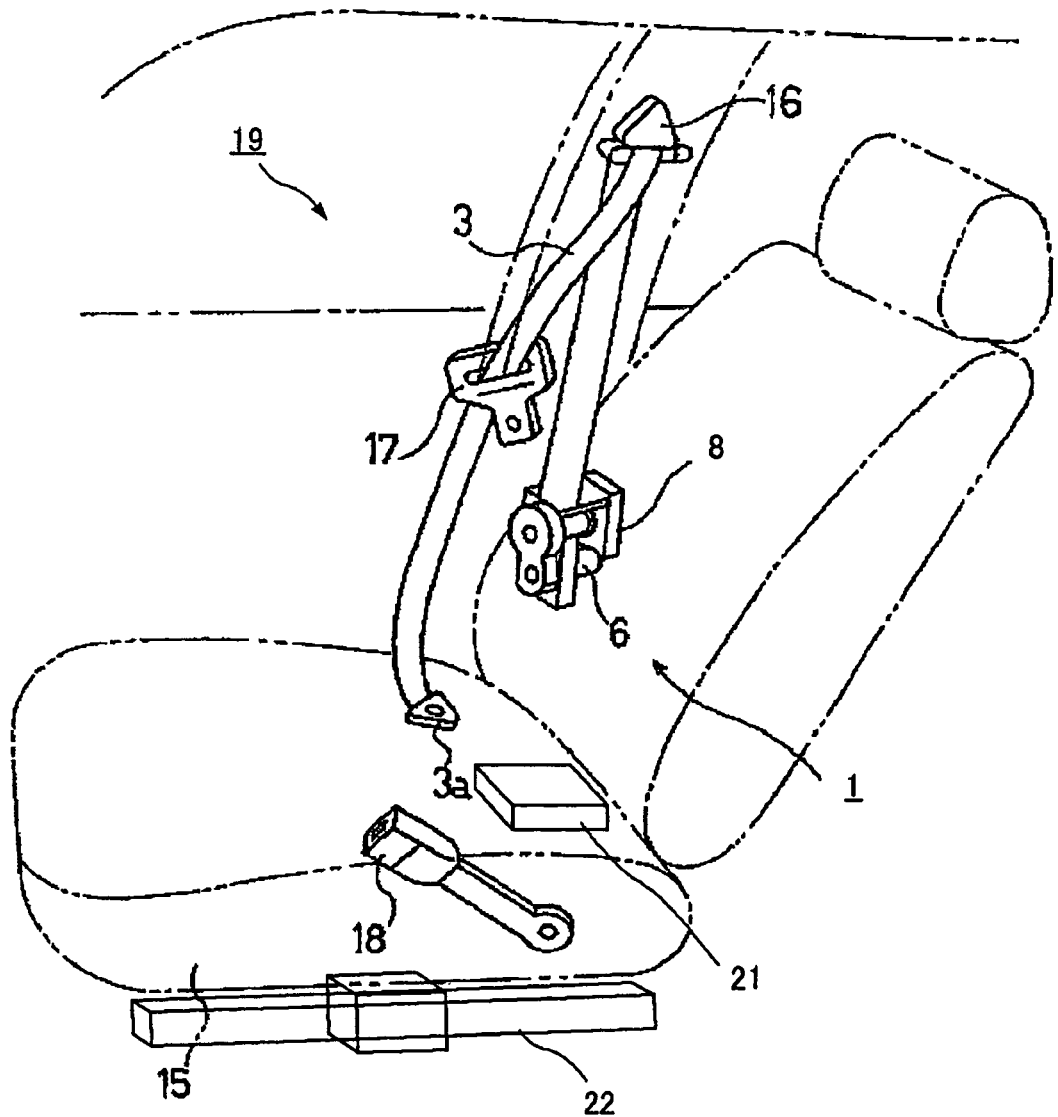
FIG. 1 is a schematic illustration showing the structure of a seat belt apparatus according to an embodiment of the present invention.

EXPLANATION OF REFERENCE SIGNS IN DRAWINGS 1 seat belt retractor (retractor)
3 seat belt
4 spool
6 electric motor (winding mechanism)
8 rotation sensor (body size index detection unit, control amount setting unit, withdrawn amount detection unit)
9 controller
10 rotary disk
17 tongue
18 buckle
19 seat belt apparatus
20 control unit (control amount setting unit, winding speed adjusting unit)
21 seat sensor (body size index detection unit)
22 seat position sensor (body size index detection unit)
23 motor driving unit (driving mechanism)

BEST MODE FOR CARRYING OUT THE INVENTION

Hereinafter, embodiments of the present invention will be described in detail with reference to the attached drawings. It should be noted that the same or corresponding components in the drawings are marked with the same numerals.

As shown in FIG. 1, a seat belt apparatus 19 of an embodiment comprises a seat belt retractor 1, a seat belt 3, a belt anchor 3a, a guide anchor 16, a tongue 17, and a buckle 18. Hereinafter, the seat belt retractor 1 will be sometimes referred to simply as the retractor 1.

The belt anchor 3a is attached to one end of the seat belt 3 and the belt anchor 3a is fixed to a floor of a vehicle body or a vehicle seat 15. The guide anchor 16 guides the seat belt 3 withdrawn from the retractor 1 to a position above one of the shoulders of an occupant and slidably supports the seat belt 3. When the seat belt 3 is not worn, the seat belt 3 is retracted by the retractor 1 and is withdrawn only for a length from the belt anchor 3a to the guide anchor 16 and from the guide anchor 16 to the retractor 1.

The tongue 17 is slidably supported on the seat belt 3 guided by the guide anchor 16. The buckle 18 is fixed to the vehicle floor or the vehicle seat 15 on a side opposite to the belt anchor 3a relative to the vehicle seat 15. The tongue 17 can be inserted and latched into the buckle 18. When the occupant wears the seat belt 3, the seat belt 3 is supported at three points, i.e. the belt anchor 3a, the guide anchor 16, and the buckle 18.

The vehicle seat 15 is provided with a seat sensor 21 and a seat position sensor 22. The seat sensor 21 measures the weight applied to the vehicle seat 15, i.e. the weight of the occupant. The seat position sensor 22 measures the position of the vehicle seat 15. The position of the seat as an object to be measured includes a position in the anteroposterior direction of the vehicle seat 15 which can slide forward and backward, a height of the vehicle seat 15 which can move up and down, an angle of a seat back, and a height of a head rest.

Figure 2:
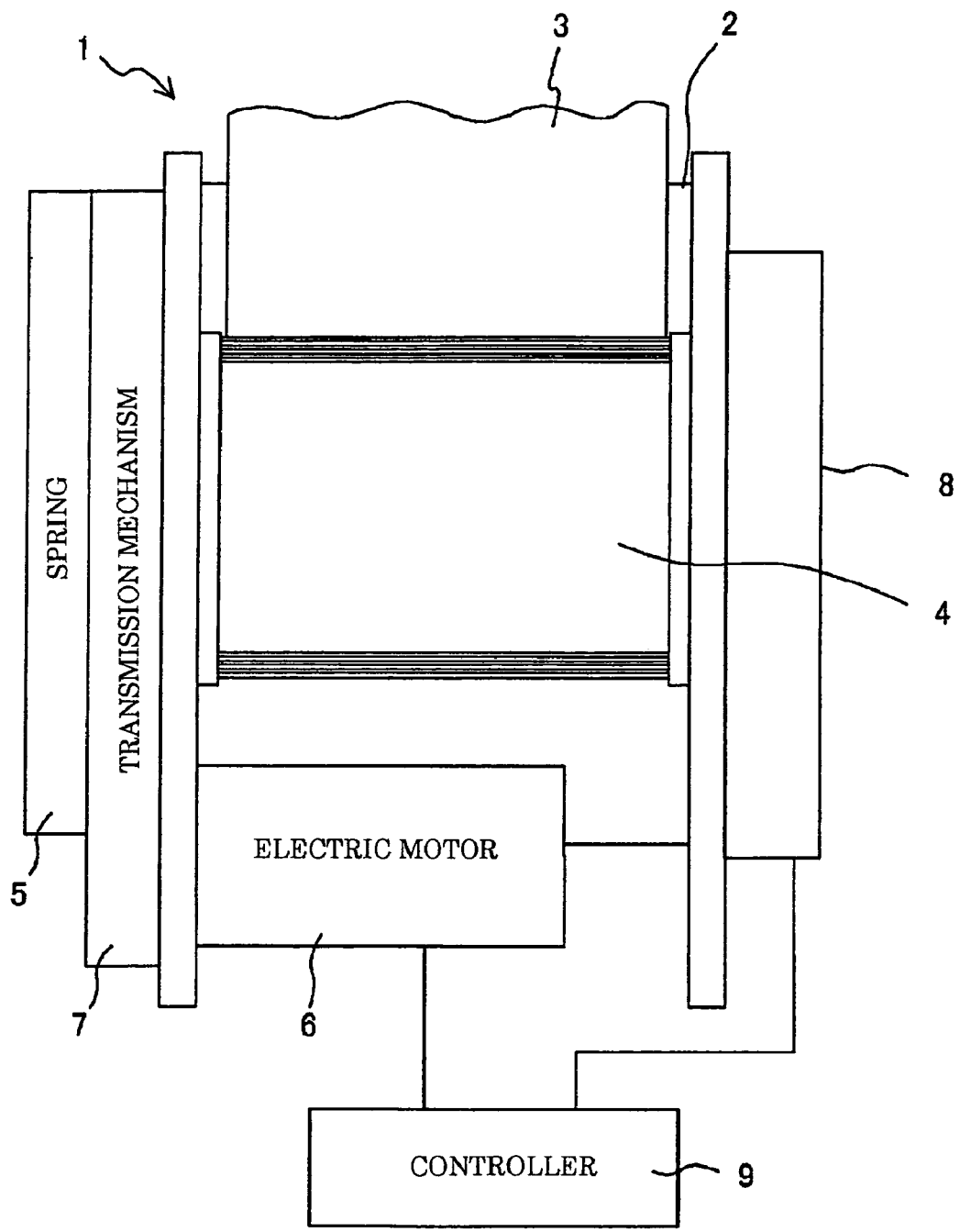
FIG. 2 is an illustration schematically showing an example of a seat belt retractor according to the present invention.

As shown in FIG. 2, the seat belt retractor 1 comprises a U-like frame 2, the seat belt 3, a spool 4, a spring 5, an electric motor 6, a transmission mechanism 7, a rotation sensor 8, and a controller 9.

The spool 4 is rotatably supported by the frame 2 and winds up the seat belt 3. The spring 5 is supported by the frame 2 and always biases the spool 4 in the winding direction.

The electric motor 6 is supported by the frame 2 and is a driving unit for rotating the spool 4 via the transmission mechanism 7. The transmission mechanism 7 is supported by the frame 2 and transmits power of the electric motor 6 to the spool 4 with changing the speed. The rotation sensor 8 is supported by the frame 2 and detects the rotation amount of the spool 4. The withdrawn amount of the seat belt 3 is obtained by the rotation amount of the spool 4. The controller 9 controls the electric motor 6 based on the detection signal of the rotation amount inputted from the rotation sensor 8.

First Embodiment

Figure 3:
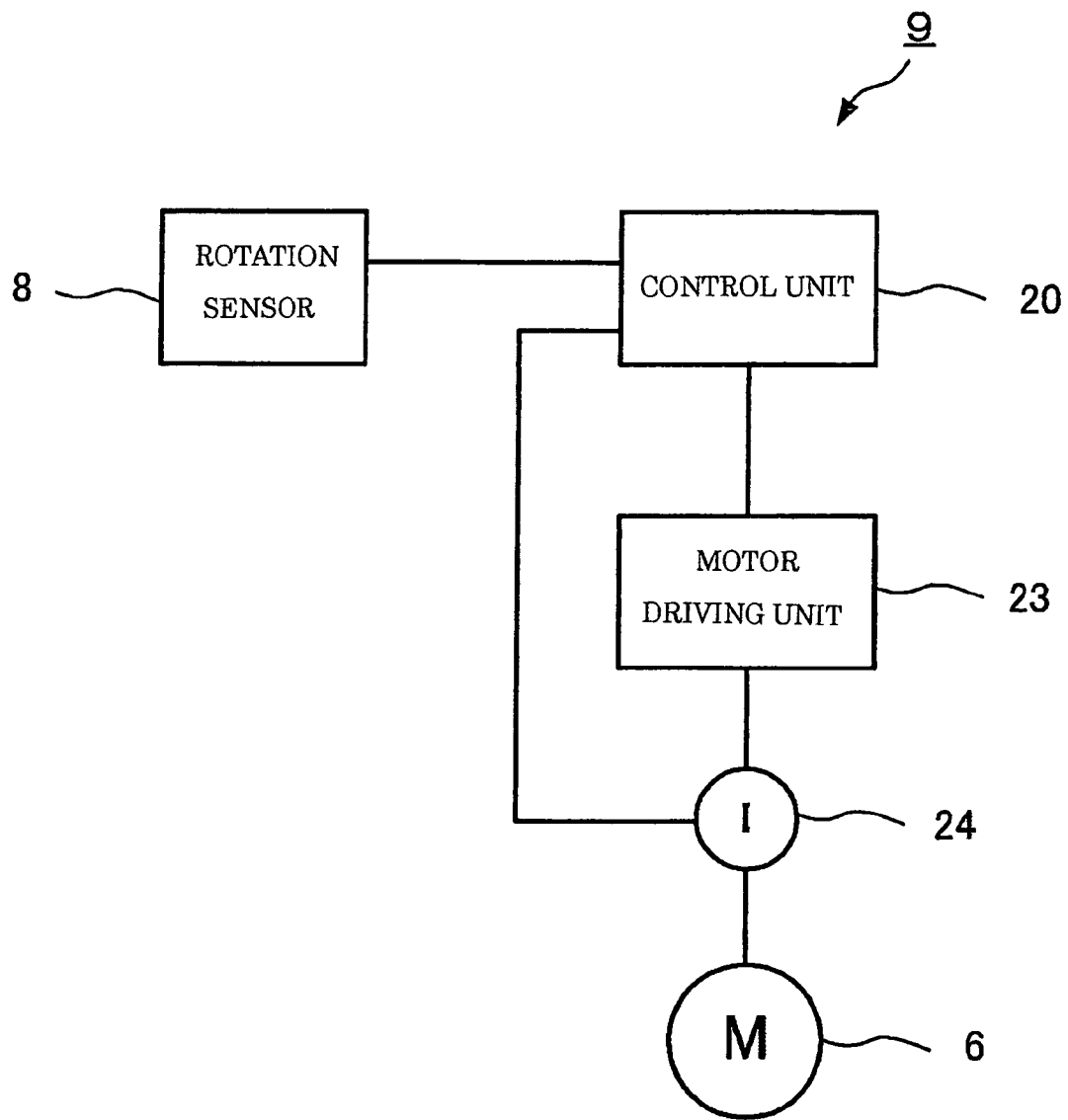
FIG. 3 is a block diagram showing the structure of a controller according to a first embodiment.

As shown in FIG. 3, the controller 9 comprises a control unit 20, a motor driving unit 23, and an ammeter 24. The control unit 20 is composed of a CPU (Central Processing Unit), a storage unit, and the like, is connected to the rotation sensor 8, and carries the winding process, as will be described later, of winding up the seat belt 3 according to a program stored in the storage unit.

The motor driving unit 23 produces a voltage or the like for driving the electric motor 6 according to a command from the control unit 20 so as to drive the electric motor 6. For example, the control unit 20 controls the rotational speed of the electric motor 6 with pulse width of signal, the motor driving unit 23 converts the pulse width of the signal as a command from the control unit 20 into a motor driving voltage and applies the voltage to the electric motor 6.

The ammeter 24 measures a value of current flowing through the electric motor 6 and sends the measured value to the control unit 20. The control unit 20 can carry out feedback control with the value of current through the electric motor 6. When the winding of the seat belt 3 is stopped due to an obstacle, the value of current flowing through the electric motor 6 is increased. Accordingly, the control unit 20 determines that the seat belt 3 is stopped.

Figure 4:
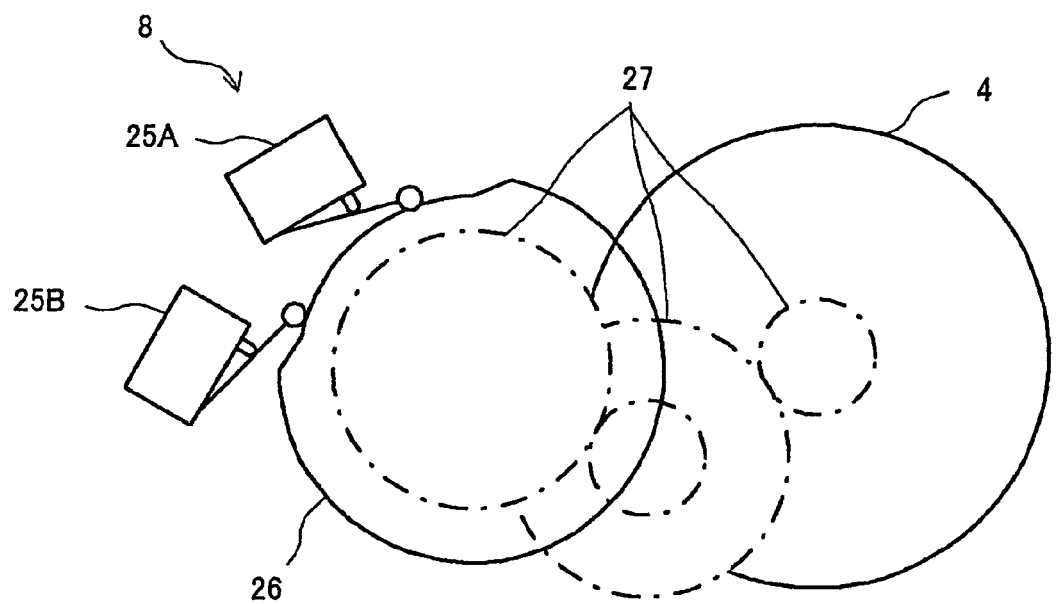
FIG. 4 is a schematic illustration showing a structural example of a rotation sensor.

FIG. 4 is a schematic illustration showing a structural example of the rotation sensor 8. The rotation sensor 8 shown in FIG. 4 comprises a speed reduction mechanism 27, a cam 26, and switches 25A, 25B. The speed reduction mechanism 27 reduces the rotation of the spool 4 and then transmits the rotation to the cam 26 disposed on an end of the speed reduction mechanism 27. The switches 25A, 25B are turned ON/OFF according to the rotation of the cam 26. For ease of understanding, the gear of the speed reduction mechanism 27 is illustrated by dashed-dotted lines. The speed reduction mechanism 27 reduces the rotation of the spool 4, from the state that the seat belt 3 is accommodated to the state that the seat belt 3 is fully withdrawn, to one turn or less of the cam 26.

FIG. 4 shows a state that the seat belt 3 is accommodated in the retractor 1 (onto the spool 4). When the seat belt 3 is withdrawn, the spool 4 is rotated in the clockwise direction in FIG. 4. At the same time, the cam 26 rotates in the clockwise direction. According to the withdrawal of the seat belt 3, the switch 25B is turned ON and then the switch 25A is turned ON. Therefore, the withdrawn amount of the seat belt 3 is detected at two stages according to the position where the switch 25B is turned ON and the position where the switch 25A is turned ON. It may be structured that the switch 25B is turned OFF when the seat belt 3 is further withdrawn. The degree of the withdrawn amount of the seat belt 3 can be determined by the combination of states of the switch 25A and the switch 25B.

As the switch for detecting the withdrawn amount, an optical sensor which is turned ON/OFF according to the light transmission or reflection may be employed. Further, the number of switches may be increased so that the withdrawn amount of the seat belt 3 can be detected at plural stages. Generally, the withdrawn amount of the seat belt 3 is long in case of an occupant having a large body size, while the withdrawn amount of the seat belt 3 is short in case of an occupant having a small body size. In that sense, the stages in the withdrawn amount of the seat belt are indexes indicating the body size of the occupant.

Figure 5:
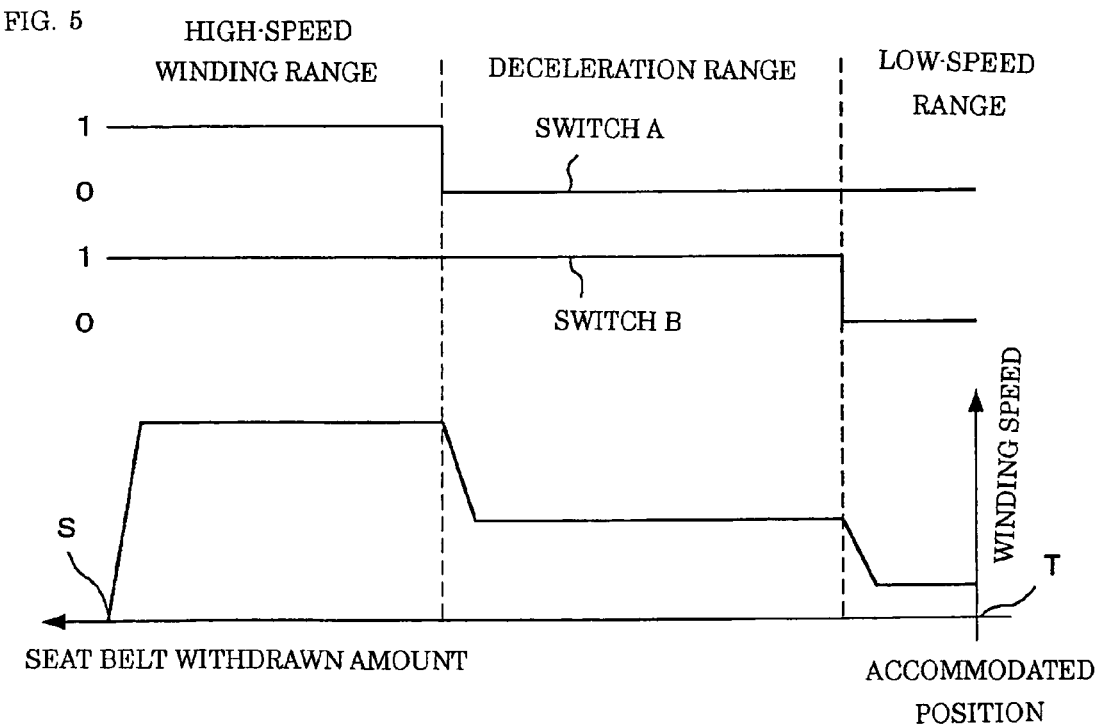
FIG. 5 is a graph showing the state of the rotation sensor and the winding speed in the winding action of the seat belt.

FIG. 5 is a graph showing the state of the rotation sensor 8 and the winding speed (the rotation speed of the electric motor 6) in the winding action of the seat belt 3. The abscissa axis indicates the withdrawn amount of the seat belt 3. In the graph of FIG. 5, the right end indicates an accommodated position T and the withdrawn amount becomes larger toward the left end. As for the line of each switch in the graph, an upper side indicates ON(1) and a lower side indicates OFF(0). The start-up point of the winding speed in the left of the graph indicates a withdrawn amount of the seat belt 3 at the start of winding, that is, a withdrawn amount of the seat belt when worn by the occupant.

In FIG. 5, the winding is started in the state that the switch 25A and the switch 25B are both ON. There may be a case that the winding is started in the state that the switch 25A is ON and the switch 25B is OFF if the seat belt 3 is further withdrawn. Alternatively, three or more switches may be provided so that multi-stage detection is provided. The state that the switch 25A is ON is a high-speed winding range. The state that the switch 25A is OFF and the switch 25B is ON is a deceleration range. The state that the switch 25A and the switch 25B are OFF is a low-speed winding range near the accommodated position T.

In case shown in FIG. 5, since the switch 25A is ON and the withdrawn amount of the seat belt is longer than that of the deceleration range and is in the high-speed winding range at the winding start point S, the winding action is started at a high speed. For example, the control unit 20 outputs pulse having a large duty ratio (large pulse width) to the motor driving unit 23 to increase the driving voltage of the electric motor 6 so as to drive the motor at a high speed.

At a point where the switch 25A is turned OFF during the winding action, the winding action is decelerated. For example, the control unit 20 changes the duty ratio of pulse to be outputted to the motor driving unit 23 to a medium degree so as to decelerate the electric motor 6. Further, at a point where the switch 25B is then turned OFF, the winding speed is reduced to a very slow speed. For example, the control unit 20 reduces the duty ratio of pulse to be outputted to the motor driving unit 23 so as to drive the electric motor 6 at the very slow speed.

After the switch 25B is turned OFF, the seat belt 3 is wound onto the spool 4 and the rotation of the electric motor 6 is stopped. As the rotation of the electric motor 6 is stopped, the current flowing through the motor 6 is increased. According to the increase in current, the driving of the electric motor 6 is stopped. For example, the control unit 20 stops outputting pulse to the motor driving unit 23.

The withdrawn amount of the seat belt from a point where the switch 25A is turned ON to a point where the seat belt 3 is worn (the winding start point S) is, for example, in a range of from about 50 to 80 cm, but depending on the body size of the occupant. The withdrawn amount of the seat belt from a point where the switch 25B is turned ON to a point where the switch 25A is turned ON (the deceleration range) is set to be such a length as to allow the electric motor 6 rotating at the high speed to be sufficiently decelerated. For example, the deceleration range is set to a length from 30 to 50 cm.

The setting between the withdrawn amount of the seat belt 3 and the switches depend on vehicle in which the seat belt apparatus 19 is installed. Especially, in case of a vehicle in which the position (height) of the guide anchor 16 is adjustable, the accommodated position T of the seat belt varies according to the position of the guide anchor 16 so that the withdrawn amount of the seat belt relative to the switch 25B is set taking such variation into consideration. That is, the position of the switch 25B is set in such a manner that the accommodated position T of the seat belt always corresponds to the right of the operation point of the switch 25B wherever the guide anchor 16 is positioned in the adjustable range. The withdrawn amount of the seat belt from the accommodated position T to the point where the switch 25B is turned ON is set to a value, for example, from about 3 to 15 cm.

In the first embodiment, the rotation sensor 8 as the withdrawn amount detection unit functions as a body size index detection unit for detecting the index indicating the body size of the occupant and also functions as a control amount setting unit for setting a control amount for winding action (in this case, a withdrawn amount of the seat belt).

Figure 6:
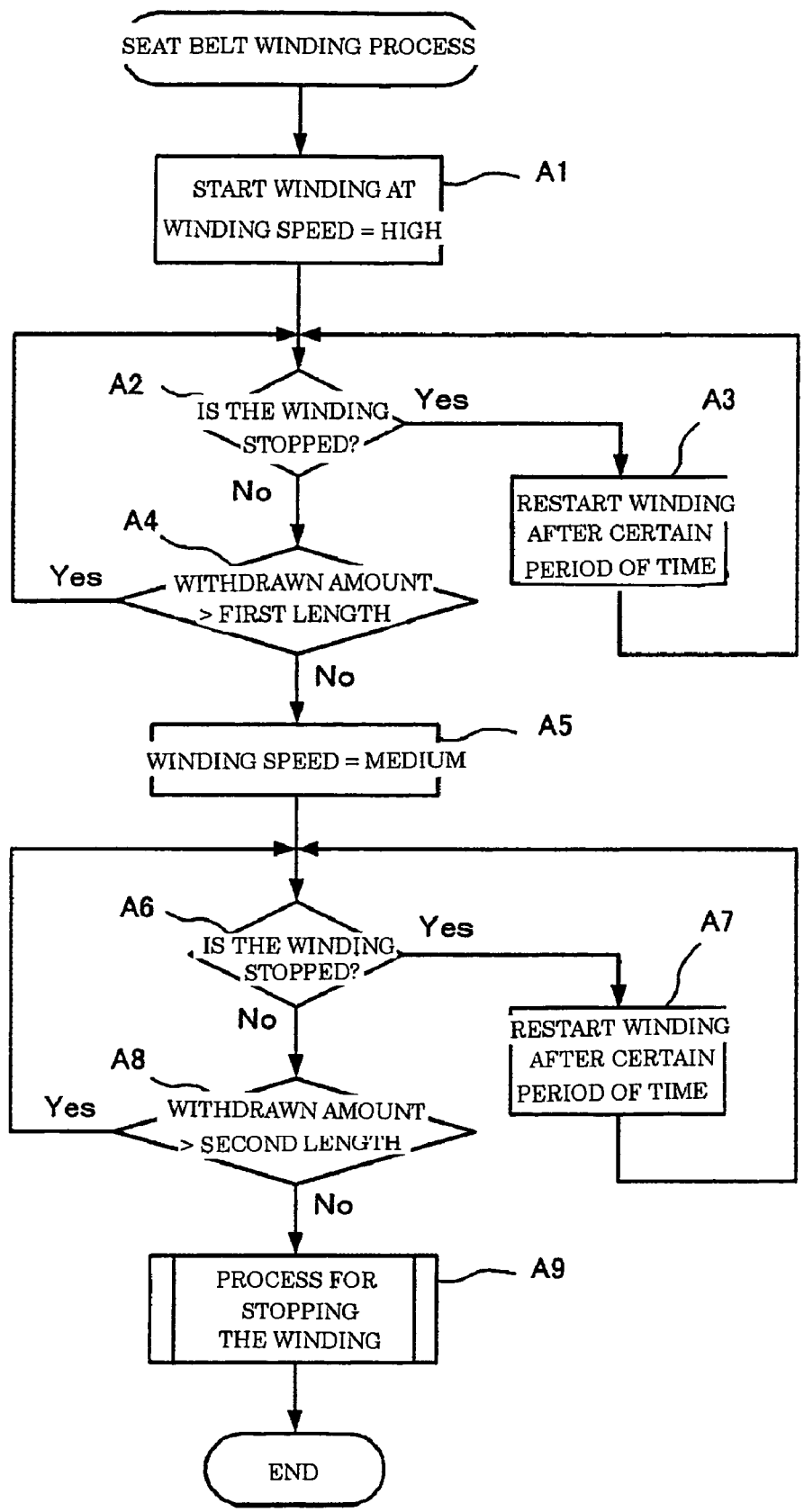
FIG. 6 is a flow chart showing an example of operation of the seat belt retractor.

Now, the operation of the seat belt retractor 1 will be described. FIG. 6 is a flow chart showing an example of operation of the seat belt retractor 1. As the engagement between the buckle 18 and the tongue 17 of the seat belt 3 is cancelled and the winding action is started, the winding is first conducted at a high speed (the winding speed is high) (step A1).

The control unit 20 monitors the current of the electric motor 6 and the switches of the rotation sensor 8. When it is determined that the current of the electric motor 6 is increased and is thus stopped (step A2; Yes), the control unit 20 restarts the winding after stopping the electric motor 6 for a certain time period (step A3).

When the electric motor 6 is not stopped (step A2; No), the winding action at the high speed is continued until the switch 25A is turned OFF, that is, while the withdrawn amount of the seat belt 3 is longer than a length (first length) for turning ON the switch 25A (step A4; Yes).

When the withdrawn amount of the seat belt 3 becomes equal to or less than the first length (step A4; No), the winding speed is reduced (the winding speed is medium) (step A5). Similarly to the winding action at the high speed, the control unit 20 monitors the current of the electric motor 6 and the switches of the rotation sensor 8. When it is determined that the current of the electric motor 6 is increased and is thus stopped (step A6; Yes), the control unit 20 restarts the winding after stopping the electric motor 6 for a certain time period (step A7).

When the electric motor 6 is not stopped (step A6; No), the winding action at the medium speed is continued until the switch 25B is turned OFF, that is, while the withdrawn amount of the seat belt 3 is longer than a length (second length) for turning ON the switch 25B (step A8; Yes).

When the withdrawn amount of the seat belt 3 becomes equal to or less than the second length (step A8; No), a process for stopping the winding action is conducted (step A9). That is, the control unit monitors the current of the electric motor 6 while the electric motor 6 is driven at the very slow speed and stops the winding action when determines that the motor current is increased. If the winding action is started in the deceleration range, the steps A2, A4 are passed and the process proceeds directly to the deceleration operation at step A5.

As mentioned above, in the seat belt retractor 1, the winding is conducted at the high speed before the deceleration range, is then decelerated for a certain range (the deceleration range), and is stopped via the winding at the low speed. As a result, regardless of the body size of the occupant wearing the seat belt 3, it is possible to quickly accommodate the seat belt 3 as well as preventing the seat belt fixture (sic) from strongly hitting the pillar or the like.

Second Embodiment

Figure 7:
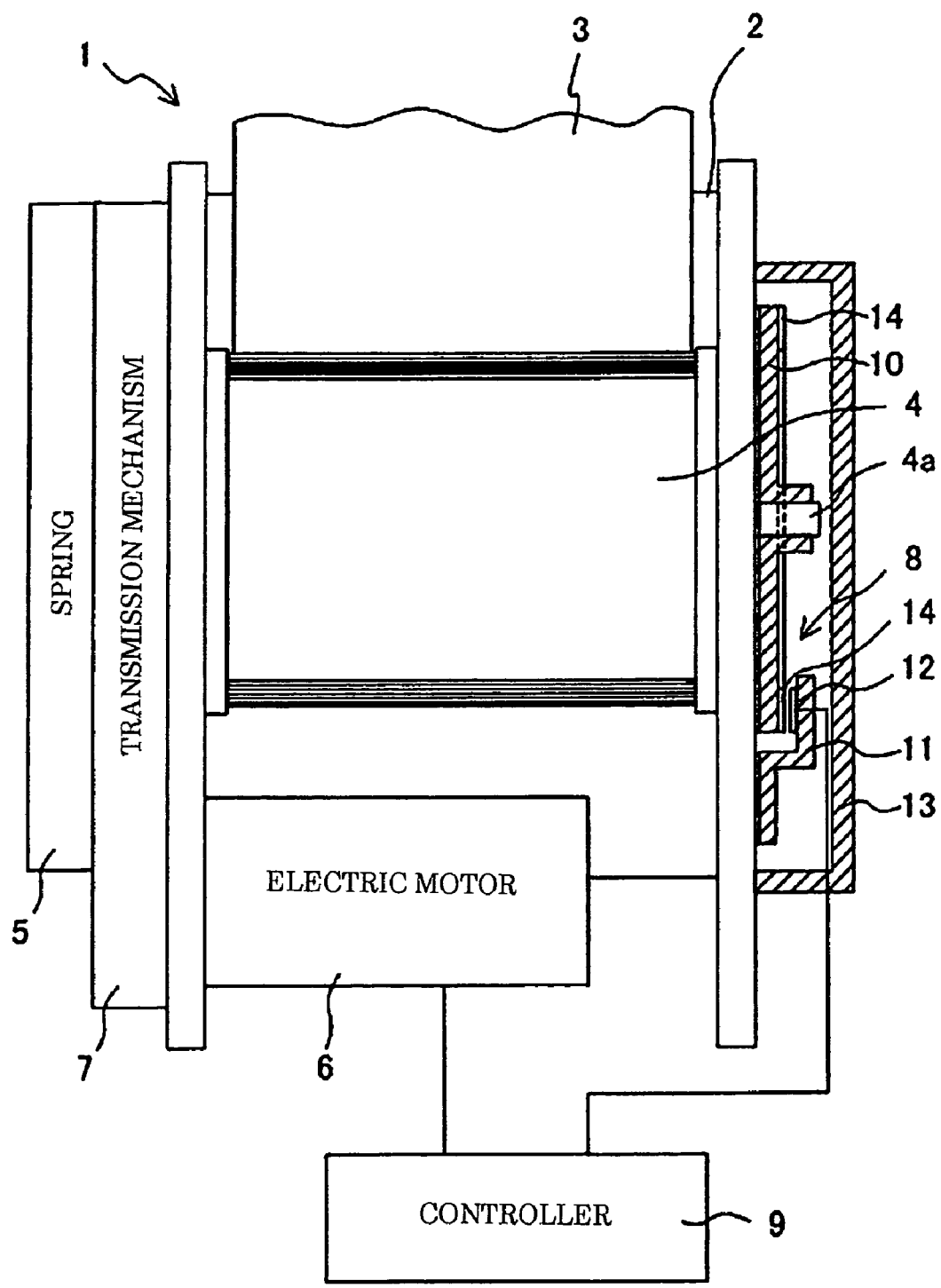
FIG. 7 is an illustration schematically showing a seat belt retractor according to a second embodiment.

FIG. 7 is an illustration schematically showing an example of a seat belt retractor 1 according to a second embodiment. In the second embodiment, the components of the retractor 1 other than the rotation sensor 8 are the same as those of the first embodiment.

A rotation sensor 8 in the second embodiment comprises a rotary disk 10, a hall element 12, and a cover 13. The rotary disk 10 is supported rotatably together with the spool 4. The hall element 12 as a magnetism detection member is supported on a frame 2 by a bracket 11. The cover 13 covers the rotary disk 10 and the hall element 12. The hall element 12 is electrically connected to a controller 9. It should be noted that the hall element 12 may be supported on the cover 13.

FIGS. 8(a)-8(d) show a structural example of the rotation sensor 8 of FIG. 7. As shown in FIG. 8(a) and 8(b), on a surface of the rotary disk 10, a number of magnets 14 are aligned along the outer periphery of the rotary disk 10 into an annular shape arranged coaxially with the rotary disk 10. These magnets 14 are composed of north pole magnets 14N and south pole magnets 14S. Each of the magnets 14N, 14S is formed to have a circumferential width corresponding to a predetermined angle in the circumferential direction. The magnets 14N, 14S are alternately arranged without space. Accordingly, the respective magnets 14N, 14S are arranged in the circumferential direction at predetermined interval equal to the circumferential width thereof. The magnets 14 are provided by attaching a plastic magnet (a magnet which is made by mixing powder of ferrite magnet or rare-earth magnet into plastic and molding the mixture), in which north poles and south poles are alternately arranged without space in the circumferential direction, to the rotary disk 10. It should be noted that the rotary disk 10 and the magnets 14 may be integrally formed.

As shown in FIGS. 8(c) and 8(d), the hall element 12 comprises a combination of a first hall element 12a and a second hall element 12b which are attached to the bracket 11 to have a predetermined distance therebetween in the circumferential direction of the annular magnet 14 to face the magnets 14 corresponding to the respective predetermined positions. In this case, the distance between two first and second hall elements 12*a*, 12*b* in the circumferential direction is set to be [odd number+(½)] times (3.5 times in the illustrated example, but it is not limited thereto) of the interval between adjacent two magnets 14N, 14S in the circumferential direction (the distance between the centers of the two magnets in the circumferential direction).

Figure 8:
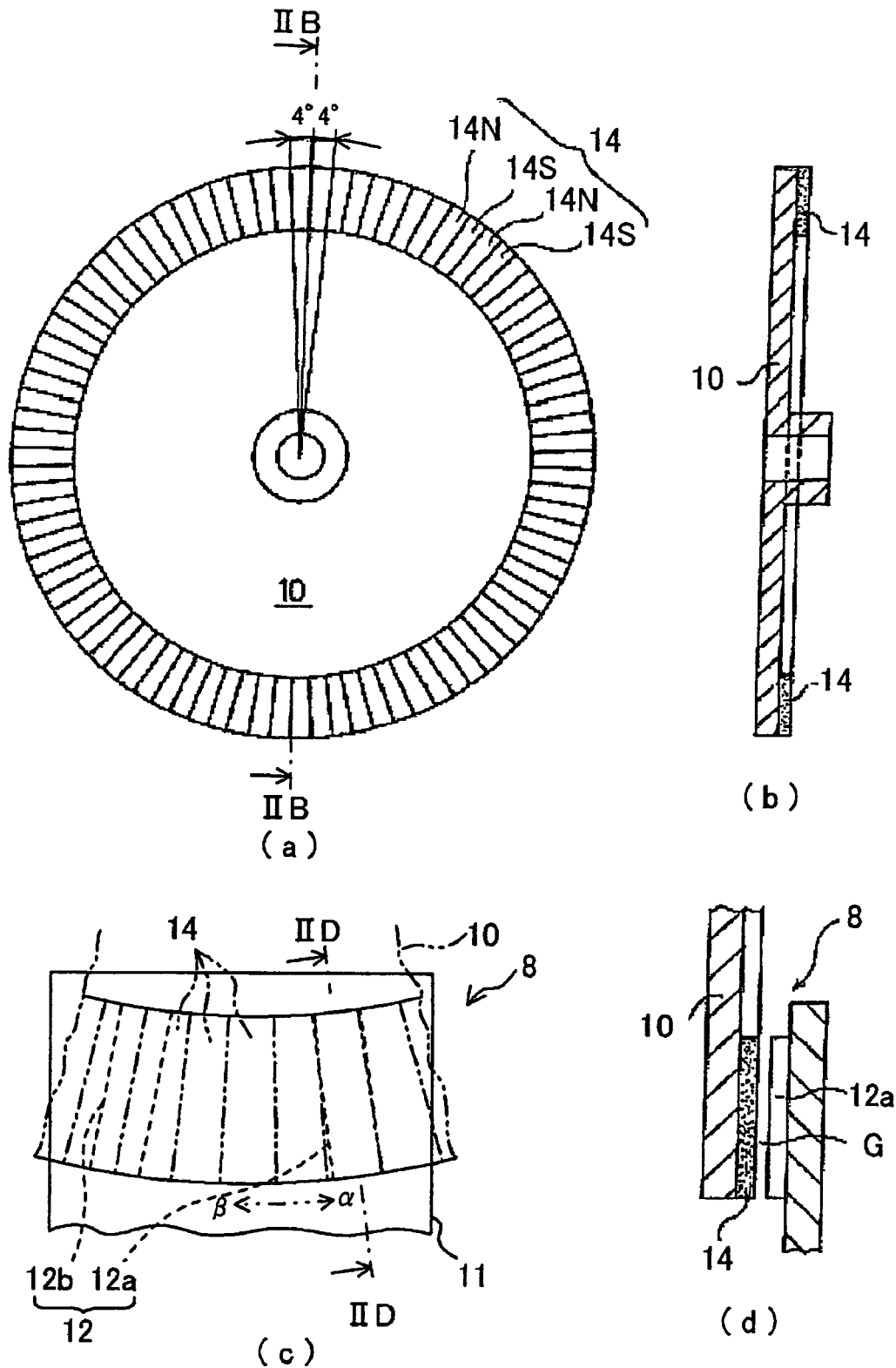
FIGS. 8(a)-8(d) are illustrations showing a structural example of a rotation sensor of FIG. 7.

It should be noted that the distance between the first and second hall elements 12*a*, 12 in the circumferential direction may be set to be [even number+(½)] times of the interval between adjacent two magnets 14N, 14S. That is, the distance between the first and second hall elements 12*a*, 12*b* in the circumferential direction may be set to be [natural number+(½)] times of the interval between adjacent two magnets 14N, 14S in the circumferential direction. The following description will be made by assuming that the interval between two magnets 14N, 14S in the circumferential direction corresponds to an angle 4° about the rotary disk and the distance between the first and second hall elements 12*a*, 12*b* is set to be [odd number+(½)] of the interval between two magnets 14N, 14S in the circumferential direction as shown in FIG. 8(*c*).

Between the first and second hall elements 12*a*, 12*b* and the magnet 14 on the rotary disk 10, a predetermined gap G is formed.

Similarly to the first embodiment (see FIG. 3), the first and second hole elements 12*a*, 12*b* of the rotation sensor 8 are both electrically connected to the controller 9. In the rotation sensor 8 having the structure as mentioned above, as the spool 4 is rotated in the belt withdrawing direction α, the first hall element 12*a* detects either one of the north pole magnet 14N and the south pole magnet 14S so that the first hall element 12*a* is turned ON so as to output a detection signal according to a current exceeding a predetermined value to the controller 9. After that, as the spool 4 is further rotated in the belt withdrawing direction α for an angle 4°, the second hall element 12*b* detects either one of the north pole magnet 14N and the south pole magnet 14S so that, similarly to the first hall element 12*a*, the second hall element 12*b* is turned ON so as to output a detection signal according to the current.

As the spool 4 is further rotated in the belt withdrawing direction α, the first hall element 12*a* is no longer detecting the one of the magnets 14 and is thus turned OFF and, after that, the first hall element 12*a* detects the other one of the north pole magnet 14N and the south pole magnet 14S and is thus turned ON so as to output a detection signal according to a current exceeding the predetermined value of a polarity opposite to the polarity of the above case to the controller 9. That is, the polarity of the current of the detection signal from the first hall element 12*a* is changed. After that, as the spool 4 is further rotated in the belt withdrawing direction α for an angle 4°, the second hall element 12*b* detects the other one of the north pole magnet 14N and the south pole magnet 14S so that, similarly to the first hall element 12*a*, the second hall element 12*b* is turned ON so as to output a detection signal according to a current of a polarity opposite to the polarity of the above case to the controller 9. That is, the polarity of the current of the detection signal from the second hall element 12*b* is changed.

The controller 9 counts the number of times the current of the detection signal from the first and second hall elements 12*a*, 12*b* is changed, thereby detecting the rotational amount of the spool 4. When the spool 4 is rotated in the belt withdrawing direction α, the phase of the detection signal from the first hall element 12*a* is ahead of the phase of the detection signal from the second hall element 12*b* by an angle 4°. Therefore, the controller 9 determines that the rotational direction of the spool 4 is the belt withdrawing direction α when the second hall element 12*b* detects the one of the north pole magnet 14N and the south pole magnet 14S during changing the detected magnet 14 of the first hall element 12*a* from the one to the other one of the north pole magnet 14N and the south pole magnet 14S.

When the spool 4 is rotated in the belt winding direction 8, the phase of the detection signal from the second hall element 12*b* is ahead of the phase of the detection signal from the second hall element 12*a* by an angle 4°. Therefore, the controller 9 determines that the rotational direction of the spool 4 is the belt winding direction β when the second hall element 12*b* detects the other one of the north pole magnet 14N and the south pole magnet 14S during changing the detected magnet 14 of the first hall element 12*a* from the one to the other one of the north pole magnet 14N and the south pole magnet 14S.

Though the circumferential width of each of the magnets 14N, 14S is set to be the angle 4° in the aforementioned example, as for the detection in the rotational direction of the spool 4 by the two first and second hall elements 12*a*, 12*b*, the circumferential width of each of the magnets 14N, 14S may be set to an angle about 2° as a half of the aforementioned angle 4° so that the first and second hall elements 12*a*, 12*b* detect each angle 2° and the calculation is made according to difference in detected values.

The controller 9 counts output pulses of the hall element 12 from the accommodated position T of the seat belt so as to obtain the withdrawn amount of the seat belt 3. When the interval between the magnets 14 is set to be enough small relative to the length of the seat belt 3, the withdrawn amount of the seat belt is considered to be continuously detected.

As the rotation sensor 8, a rotary encoder may be employed instead of the cam 26 attached to the speed reduction mechanism 27 in FIG. 4 so as to continuously detect the withdrawn amount of the seat belt 3. The position of origin may be recognized by employing a combination of a device like the switch 25B of the rotation sensor 8 in FIG. 4 which detects absolute rotational position of the spool 4 and the hall elements 12.

Figure 9:
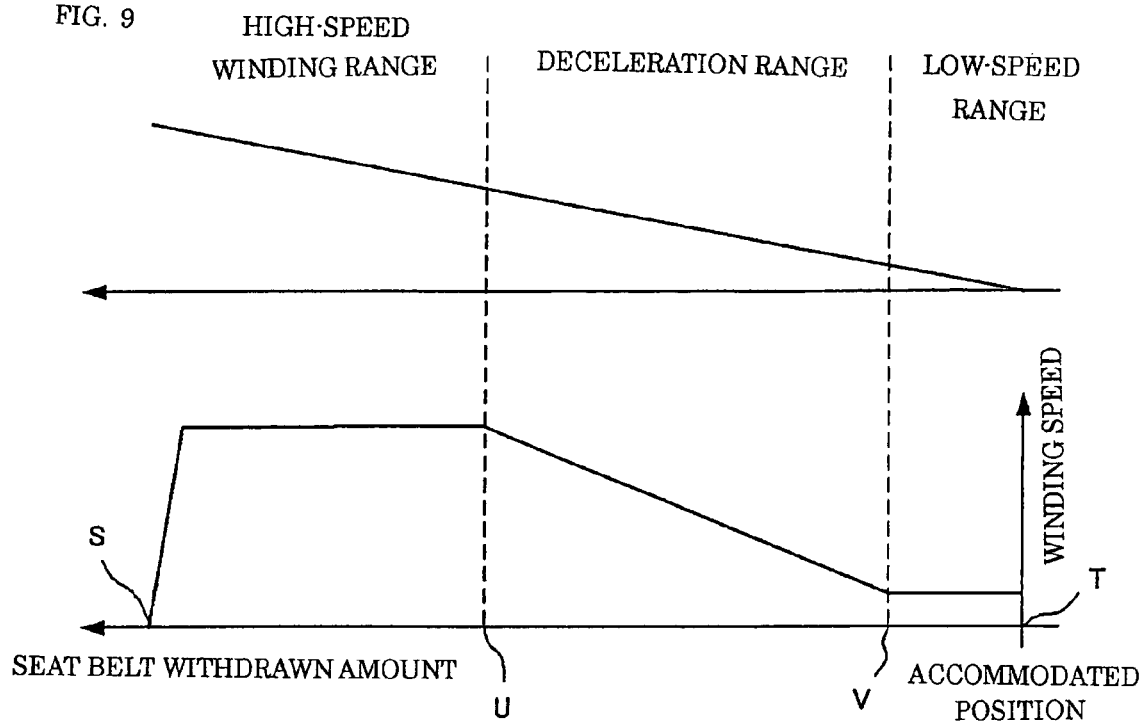
FIG. 9 is a graph showing the withdrawn amount of the seat belt and the winding speed in the winding action of the seat belt according to the second embodiment.

FIG. 9 is a graph showing the withdrawn amount of the seat belt and the winding speed (the rotational speed of the electric motor 6) in the winding action of the seat belt 3 according to the second embodiment. The abscissa axis indicates the withdrawn amount of the seat belt 3. In the graph of FIG. 9, the right end indicates the accommodated state and the withdrawn amount becomes larger toward the left end. An upper part of the graph in FIG. 9 indicates pulse number of the rotation sensor 8 from the accommodated position T. The start-up point of the winding speed in the left of the graph indicates a withdrawn amount of the seat belt 3 at the start of winding, that is, a withdrawn amount of the seat belt when worn by the occupant.

In the second embodiment, the winding speed is controlled according to the withdrawn amount corresponding to a predetermined pulse number of the rotation sensor 8. In FIG. 9, a pulse number at a point U is set as a first length and a pulse number at a point V is set as a second length. A range in which the withdrawn amount is longer than that at the point U is set as a high-speed winding range. A range between the point U and the point V is set as a deceleration range. A range in which the withdrawn amount is shorter than that at the point V is set as a low-speed range.

The action in the high-speed range is the same as the first embodiment (see FIG. 5). In case of FIG. 9, since the start point S is in the high-speed winding range, the winding action is started at a high speed. For example, the control unit 20 outputs pulse having a large duty ratio (large pulse width) to the motor driving unit 23 to increase the driving voltage of the electric motor 6 so as to drive the motor 6 at a high speed.

When the withdrawn amount of the seat belt reaches the point U during the winding action, the winding speed is reduced in proportion to the withdrawn amount. For example, the control unit 20 reduces the duty ratio of pulse to be outputted to the motor driving unit 23 in proportion to the withdrawn amount so as to decelerate the electric motor 6. The proportionality factor for deceleration is set in such a manner as to obtain the predetermined winding speed at the point V. When the withdrawn amount reaches the point V, the winding action is held at the very slow speed. For example, the control unit 20 sets the duty ratio of pulse to be outputted to the motor driving unit 23 small so as to drive the electric motor 6 at the very slow speed.

As the seat belt 3 is wound onto the spool 4 so that the rotation of the electric motor 6 is stopped after the count of the pulse number of the rotation sensor 8 reaches the point V, the current flowing through the motor 6 is increased. According to the increase in current, the driving of the electric motor 6 is stopped. For example, the control unit 20 stops outputting pulse to the motor driving unit 23.

The withdrawn amounts of the seat belt at the point U and the point V are set to be the same as the withdrawn amounts at the actuation points of the switch 25A and the switch 25B of the first embodiment. The state where the seat belt apparatus 19 is installed to the vehicle and the seat belt 3 is completely accommodated is set as the origin and the count of pulse number at a point where the spool 4 is stopped, i.e. the origin, is stored into a nonvolatile memory, thereby recognizing the withdrawn amount of the seat belt. Alternatively, the position as the origin may be recognized, for example, by a combination of the switch 25B of the rotation sensor 8 of FIG. 4 and the count of the pulse number.

Figure 10:
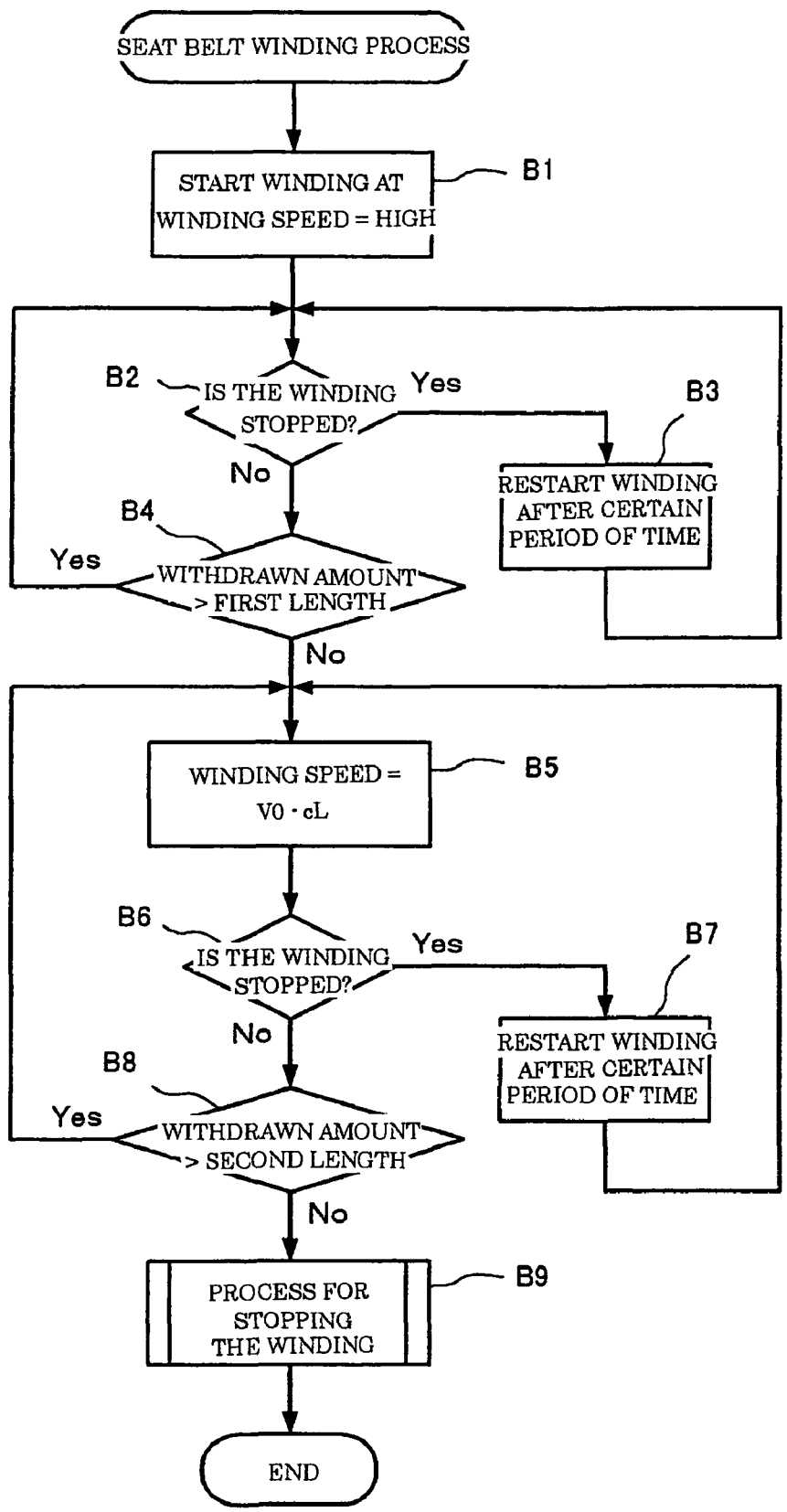
FIG. 10 is a flow chart showing an example of the operation of the seat belt retractor according to the second embodiment.

Now, the operation of the seat belt retractor 1 will be described. FIG. 10 is a flow chart showing an example of operation of the seat belt retractor 1 according to the second embodiment. The controller 9 always counts the pulse number of the rotation sensor 8 so as to recognize the present withdrawn amount of the seat belt. As the engagement between the buckle 18 and the tongue 17 of the seat belt 3 is cancelled and the winding action is started, the winding is first conducted at a high speed (the winding speed is high) (step B1).

The control unit 20 monitors the current of the electric motor 6 and the switches (sic) of the rotation sensor 8. When it is determined that the current of the electric motor 6 is increased and is thus stopped (step B2; Yes), the control unit 20 restarts the winding after stopping the electric motor 6 for a certain time period (step B3). When the electric motor 6 is not stopped (step B2; No), the winding action at the high speed is continued while the withdrawn amount of the seat belt 3 is longer than the first length (step B4; Yes).

When the withdrawn amount of the seat belt 3 becomes equal to or less than the first length (step B4; No), the winding speed is reduced in proportion to the withdrawn amount of the seat belt (step B5). For example, assuming the speed of the winding action at the high speed as "V0", the withdrawn amount of the seat belt as "L", and the proportional constant as "c", the winding speed is obtained as follows:

winding speed=$V0-cL$

The proportional constant "c" is set in such a manner that the predetermined winding speed is ensured when the withdrawn amount is at the point V.

Similarly to the winding action at the high speed, the control unit 20 monitors the current of the electric motor 6 and the switches (sic) of the rotation sensor 8. When it is determined that the current of the electric motor 6 is increased and is thus stopped (step B6; Yes), the control unit 20 restarts the winding action after stopping the electric motor 6 for a certain time period (step B7).

When the electric motor 6 is not stopped (step B6; No), the winding action at speed in proportion to the withdrawn amount of the seat belt is continued while the withdrawn amount of the seat belt 3 is longer than the second length (step B8; Yes).

When the withdrawn amount of the seat belt 3 becomes equal to or less than the second length (step B8; No), a process for stopping the winding action is conducted (step B9). That is, the control unit monitors the current of the electric motor 6 while the electric motor 6 is driven at the very slow speed and stops the winding action when determines that the motor current is increased. If the winding action is started in the deceleration range, the steps B2, B4 are passed and the process proceeds directly to the deceleration operation at step B5.

As mentioned above, in the seat belt retractor 1, the winding is conducted at the high speed before the deceleration range, is then decelerated for a certain range (the deceleration range), and is stopped via the winding at the low speed. As a result, regardless of the body size of the occupant wearing the seat belt 3, it is possible to quickly accommodate the seat belt 3 as well as preventing the seat belt fixture (sic) from strongly hitting the pillar or the like. Since the winding speed is reduced in proportion to the withdrawn amount of the seat belt in the deceleration range, smooth winding action can be provided.

Third Embodiment

Figure 11:
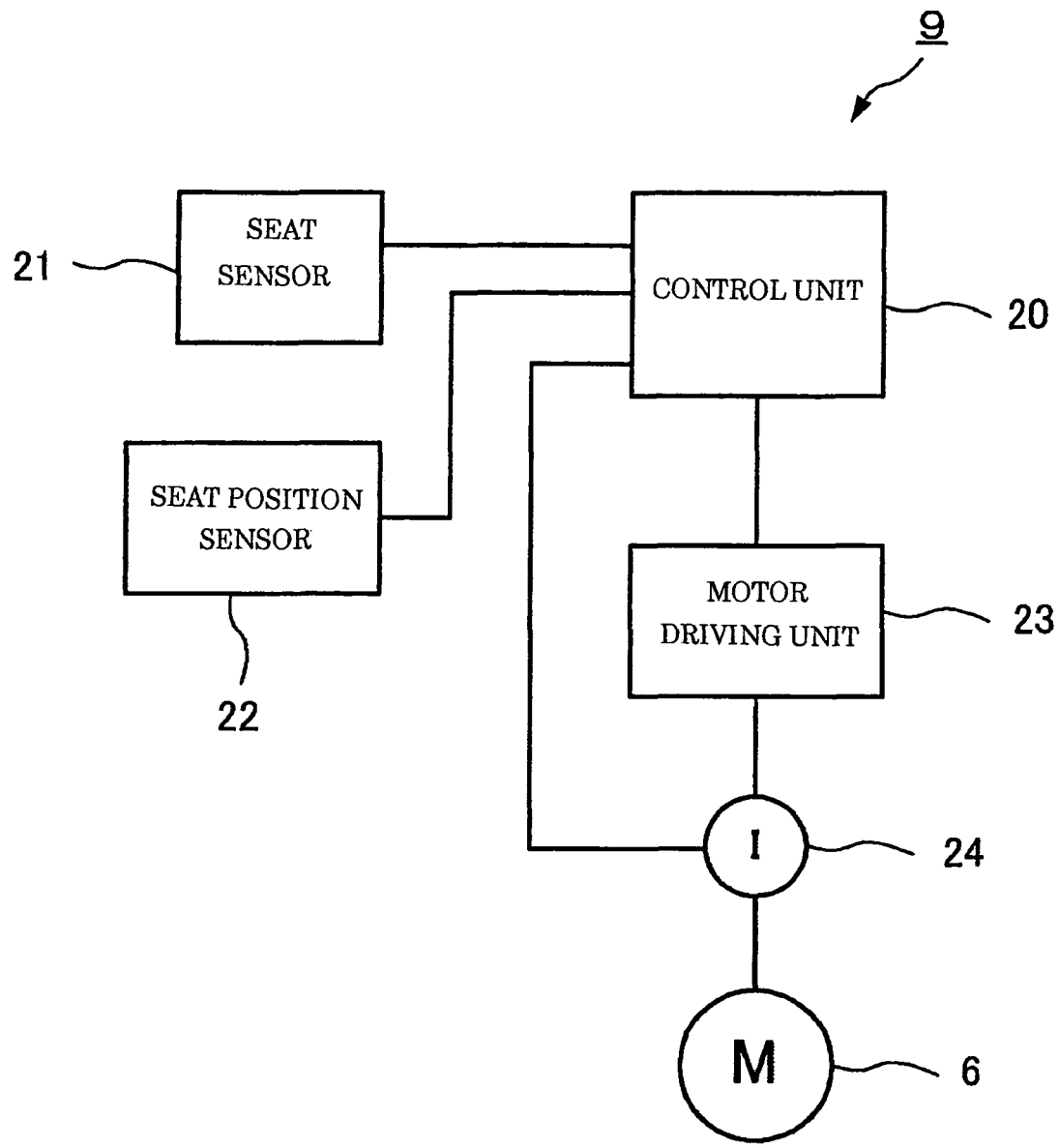
FIG. 11 is a block diagram showing the structure of a controller according to a third embodiment.

In the third embodiment, index indicating the body size of the occupant other than the withdrawn amount of the seat belt is employed. Returning to FIG. 1, the retractor 1 includes a seat sensor 21 or a seat position sensor 22. FIG. 11 is a block diagram showing the structure of a controller 9 according to the third embodiment. Instead of the rotation sensor 8, the seat sensor 21 and the seat position sensor 22 are connected to a control unit 20. The other components are the same as those of the first embodiment.

The seat sensor 21 detects the weight applied to the vehicle seat 15. The seat position sensor 22 detects the position of the vehicle seat 15 when the driving posture is adjusted according to the body size of the occupant. As for the position of the seat, a height of the vehicle seat 15, an angle of a seat back, and a height of a head rest may be detected as well as a slide position in the anteroposterior direction of the vehicle seat 15.

The control unit 20 inputs the weight applied to the vehicle seat 15 from the seat sensor 21. Since the occupant normally grounds his or her feet on the floor, the weight detected by the seat sensor 21 is different from the real weight of the occupant, but functions as an index indicating the body size of the occupant. The controller 9 inputs the position of the vehicle seat 15 from the seat position sensor 22. Since the occupant sets the seat position according to his or her body size in preparation for driving, the seat position functions as an index indicating the body size of the occupant. Since there is a correlation between the withdrawn amount of the seat belt when the occupant wears the seat belt 3 and the weight of the occupant or the seat position, the minimum withdrawn amount of the seat belt relative to the weight or the seat position can be statistically estimated.

The index indicating the body size of the occupant may be only either one of the weight applied to the vehicle seat 15 and the seat position. As for a front passenger seat, the seat position may be set regardless of the body size of the occupant. As for a rear seat, the seat position may be fixed. In these cases, only the weight detected by the seat sensor 21 may be employed as an index indicating the body size of the occupant.

The control unit 20 calculates the withdrawn amount of the seat belt based on the weight applied to the vehicle seat 15 and/or the seat position using a table or a relational expression statistically obtained. Corresponding to the withdrawn amount of the seat belt, a time (first time) to be taken from the start of winding to the deceleration range and a time (second time) to be taken from the start of winding to the low-speed range during winding the seat belt 3 are set.

The control unit 20 conducts the winding action at a high speed from the start of winding until the first time elapses. The control unit 20 decelerates the winding action after the first time elapses. For example, the control unit 20 changes the duty ratio of pulse to be outputted to the motor driving unit 23 to a medium degree so as to decelerate the electric motor 6. Further, at a point where the second time elapses, the winding speed is reduced to a very slow speed. For example, the control unit 20 reduces the duty ratio of pulse to be outputted to the motor driving unit 23 so as to drive the electric motor 6 at the very slow speed.

After the second time elapses and the winding speed is changed to the very slow speed, the seat belt 3 is wound onto the spool 4 and the rotation of the electric motor 6 is stopped. As the rotation of the electric motor 6 is stopped, the current flowing through the motor 6 is increased. According to the increase in current, the driving of the electric motor 6 is stopped. For example, the control unit 20 stops outputting pulse to the motor driving unit 23.

Assuming that the withdrawn amount of the seat belt is the minimum value statistically obtained corresponding to the weight or the seat position, the first time and the second time are set according to the obtained withdrawn amount of the seat belt, thereby preventing the tongue 17 from hitting the pillar or the like during the winding action at the high speed. The withdrawn amount of the seat belt is calculated according to the body size of the occupant and the first time is set according to the obtained withdrawn amount of the seat belt, thereby preventing the winding action from being too slow even in case of the occupant having a large body size.

Figure 12:
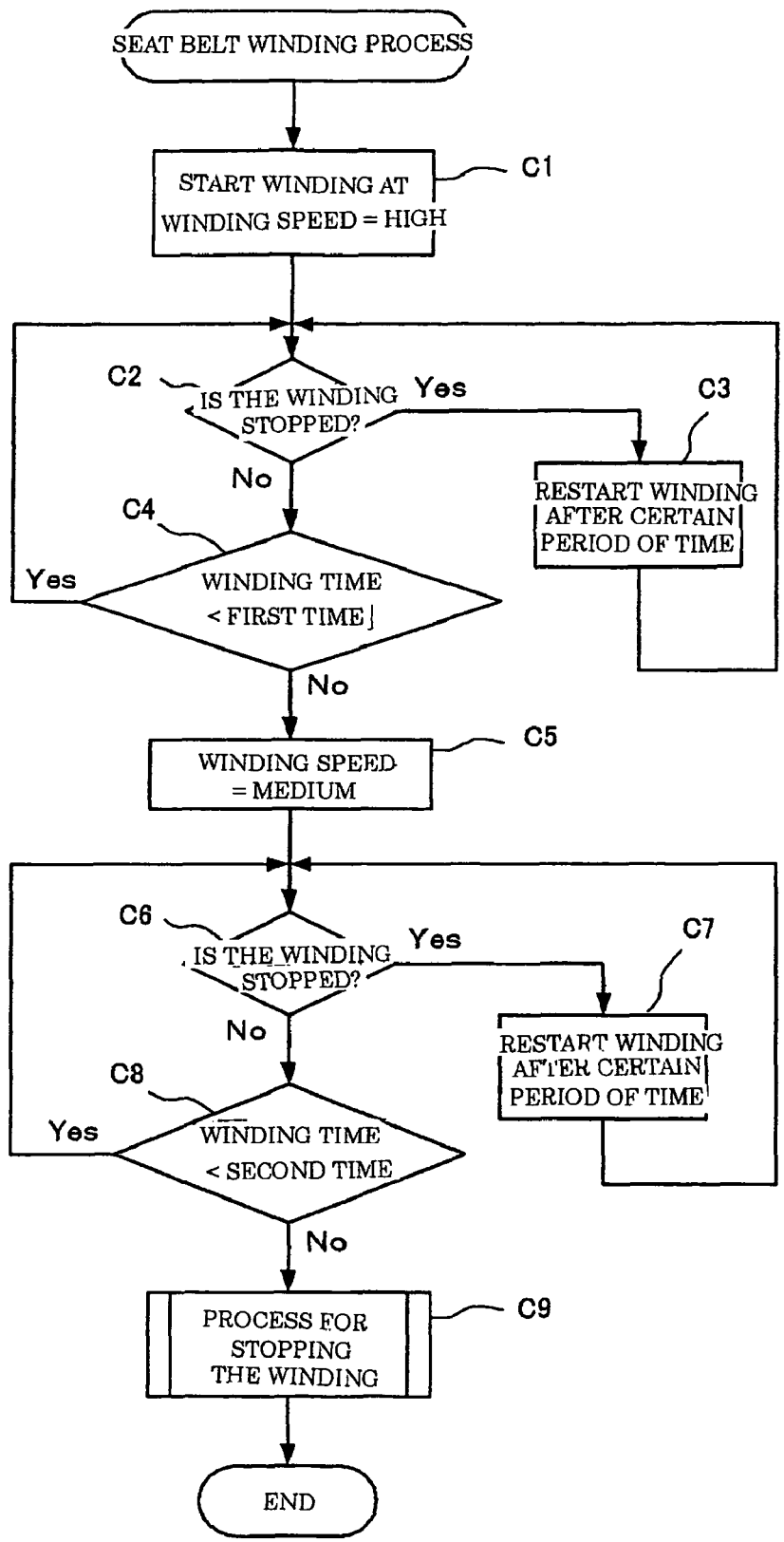
FIG. 12 is a flow chart showing an example of operation of a seat belt retractor according to the third embodiment.

FIG. 12 is a flow chart showing an example of operation of the seat belt retractor 1 according to the third embodiment. The control unit 20 previously calculates the withdrawn amount of the seat belt based on the weight applied to the vehicle seat 15 or the position of the vehicle seat 15 so as to set the first time and the second time. As the engagement between the buckle 18 and the tongue 17 of the seat belt 3 is cancelled and the winding action is started, the winding is first conducted at a high speed (the winding speed is high) (step C1).

The control unit 20 monitors the current of the electric motor 6 and the switches of the rotation sensor 8 (sic). When it is determined that the current of the electric motor 6 is increased and is thus stopped (step C2; Yes), the control unit 20 restarts the winding after stopping the electric motor 6 for a certain time period (step C3). The time period in which the electric motor 6 is stopped is not included into the time taken for winding. When the electric motor 6 is not stopped (step C2; No), the winding action at the high speed is continued until the first time elapses (step C4; Yes).

When the first time elapses (step C4; No), the winding speed is reduced (the winding speed is set to a medium speed) (step C5). Similarly to the winding action at the high speed, the control unit 20 monitors the current of the electric motor 6 and the switches of the rotation sensor 8 (sic). When it is determined that the current of the electric motor 6 is increased and is thus stopped (step C6; Yes), the control unit 20 restarts the winding action after stopping the electric motor 6 for a certain time period (step C7). The time period in which the electric motor 6 is stopped is not included into the time taken for winding. When the electric motor 6 is not stopped (step C6; No), the winding action at the medium speed is continued until the second time elapses (step C8; Yes).

When the second time elapses (step C8; No), a process for stopping the winding action is conducted (step C9). That is, the control unit monitors the current of the electric motor 6 while the electric motor 6 is driven at the very slow speed and stops the winding action when determines that the motor current is increased.

As mentioned above, in the seat belt retractor 1, the winding is conducted at the high speed until the first time elapses, is then decelerated from the first time to the second time, and is stopped via the winding at the low speed. The first time and the second time are set according to the index indicating the body size of the occupant. As a result, regardless of the body size of the occupant wearing the seat belt 3, it is possible to quickly accommodate the seat belt 3 as well as preventing the seat belt fixture (sic) from strongly hitting the pillar or the like.

The structures and the flow charts of actions of the seat belt retractors 1 which have been described in the aforementioned embodiments are examples so that various changes and modifications may be made. The rotation sensor 8, the seat sensor 21, and the seat position sensor 22 for detecting indexes indicating the body size of the occupant are not the only means and are not limited to those. For example, there has been proposed a method of controlling the seat belt retractor 1 by photographing the surface profile (body shape itself) of an occupant and the surface profile of a seat with a C-MOS 3D camera (sensor) and extracting the body size and posture of the occupant and the seat position. Since the C-MOS 3D camera is disclosed in JP-A-2007-22401, detailed description will be omitted.

This application claims priority based on Japanese Patent Application No. 2006-317730 which was filed Nov. 24, 2006 and which is hereby incorporated herein by reference.

INDUSTRIAL APPLICABILITY

The present invention is applicable to a seat belt retractor having a function of winding up a seat belt by means of a motor, a seat belt apparatus, a seat belt winding method, a computer program, and a seat belt system.

What is claimed is:
1. A seat belt retractor comprising:
a body size index detection unit for detecting an index indicating the body size of an occupant;
a reference value setting unit for setting a first reference value of a predetermined parameter, which varies according to the winding of a seat belt, based on the index detected by said body size index detection unit;
a winding mechanism for winding said seat belt; and
a winding speed adjusting unit which sets the winding speed of said winding mechanism to a first speed between the time when said winding mechanism starts winding of said seat belt and the time when said predetermined parameter reaches said first reference value, and sets the winding speed of said winding mechanism to a second speed slower than said first speed after said predetermined parameter reaches said first reference value.

2. A seat belt retractor as claimed in claim 1, wherein
said body size index detection unit detects the withdrawn amount of said seat belt from the seat belt retractor;
said predetermined parameter is the withdrawn amount of said seat belt;
said reference value setting unit sets a first withdrawn amount of said seat belt as said first reference value; and
said winding speed adjusting unit sets said winding speed of said winding mechanism to said first speed between the time when said winding mechanism starts the winding of said seat belt and the time when said withdrawn amount of said seat belt reaches said first withdrawn amount, and sets said winding speed of said winding mechanism to said second speed when said withdrawn amount reaches the said first withdrawn amount.

3. A seat belt retractor as claimed in claim 1, wherein
said reference value setting unit sets said first reference value and a second reference value corresponding to a case where the winding amount is larger than the winding amount for said first reference value, and
said winding speed adjusting unit sets said winding speed of said winding mechanism to said first speed between the time when said winding mechanism starts the winding of said seat belt and the time when said predetermined parameter reaches said first reference value, sets said winding speed of said winding mechanism to said second speed lower than said first speed when said predetermined parameter reaches the said first reference value, and stops the winding by said winding mechanism after said predetermined parameter reaches said second reference value.

4. A seat belt retractor as claimed in claim 1, wherein said reference value setting unit further sets, based on the index detected by said body size index detection unit, a second reference value where said predetermined parameter reaches after said first reference value according to the winding of said seat belt progresses,
said winding speed adjusting unit sets said winding speed of said winding mechanism to said first speed between the time when said winding mechanism starts the winding of said seat belt and the time when said predetermined parameter reaches said first reference value, sets said winding speed of said winding mechanism to said second speed when said predetermined parameter exceeds the said first reference value, and stops the winding by said winding mechanism after said predetermined parameter reaches said second reference value.

5. A seat belt retractor as claimed in claim 1, wherein
said body size index detection unit detects the withdrawn amount of said seat belt from the seat belt retractor,
said predetermined parameter is the withdrawn amount of said seat belt,
said reference value setting unit sets a first withdrawn amount of said seat belt as the first reference value and sets a second withdrawn amount, which is smaller than said first withdrawn amount, as the second reference value,
said winding speed adjusting unit sets the winding speed of said winding mechanism to said first speed between the time when said winding mechanism starts the winding of said seat belt and the time when the withdrawn amount of said seat belt reaches said first withdrawn amount, sets the winding speed of said winding mechanism to said second speed when said withdrawn amount becomes equal to or lower than said first withdrawn amount, and stops the winding action of said seat belt when said withdrawn amount becomes equal to or lower than said second withdrawn amount.

6. A seat belt retractor as claimed in claim 2, wherein said body size index detection unit detects the withdrawn amount of said seat belt at least at two stages corresponding to said first withdrawn amount and said second withdrawn amount.

7. A seat belt retractor as claimed in claim 2, wherein said body size index detection unit detects continuously the withdrawn amount of said seat belt in proportion to the withdrawn amount.

8. A seat belt retractor as claimed in claim 2, wherein said winding mechanism has continuously or stepwisely variable winding speed, and
said winding speed adjusting unit continuously or stepwisely reducing the winding speed according to the withdrawn amount when the withdrawn amount of said seat belt becomes equal to or lower than said first withdrawn amount.

9. A seat belt retractor as claimed in claim 2, wherein said reference value setting unit obtains the withdrawn amount of the seat belt based on said index and sets a first winding time and a second winding time longer than the first winding time according to the obtained withdrawn amount, and
said winding speed adjusting unit sets the winding speed of said winding mechanism to the first speed between the time when said winding mechanism starts the winding of said seat belt and the time when said first winding time elapses, sets the winding speed of said winding mechanism to said second speed at a point when said winding time elapses, and stop the winding action of said seat belt after said second winding time elapses.

10. A seat belt retractor as claimed in claim 2, wherein said body size index detection unit detects the weight of the occupant and/or the surface profile of the occupant and/or the seat position, and
said reference value setting unit estimates the withdrawn amount of the seat belt based on said weight and/or the surface profile of the occupant and/or the seat position.

11. A seat belt apparatus, comprising:
a fixing member for fixing an end of a seat belt;
a seat belt retractor which is connected to the other end of said seat belt to wind up said seat belt;
an engaging member through which said seat belt is inserted and is slidably supported;
a buckle which is disposed on a side opposite to said fixing member relative to a seat and is engaged with said engaging member; and
a guide member which is located above said fixing member, through which said seat belt is inserted, and which supports slidably said seat belt, wherein
said seat belt retractor comprises:
a body size index detection unit for detecting an index indicating the body size of an occupant;
a reference value setting unit for setting a first reference value of a predetermined parameter, which varies according to the winding of said seat belt, based on the index detected by said body size index detection unit;
a winding mechanism for winding said seat belt; and
a winding speed adjusting unit which sets the winding speed of said winding mechanism to a first speed between the time when said winding mechanism starts winding of said seat belt and the time when said predetermined parameter reaches said first reference value, and sets the winding speed of said winding mechanism to a second speed slower than said first speed after said predetermined parameter reaches said first reference value.

12. A seat belt winding method comprising:
  detecting the withdrawn amount of a seat belt when an occupant wears the seat belt;
  setting a predetermined reference value based on the detected withdrawn amount; and
  winding said seat belt at a first speed until said withdrawn amount reaches a reference value, and winding said seat belt at a second speed lower than said first speed after said withdrawn amount reaches the reference value according to the winding of said seat belt.

13. A seat belt winding method as claimed in claim 12, comprising:
  further setting a second reference value lower than the first reference value according to the withdrawn amount of the seat belt when the occupant wears the seat belt, and
  setting the winding speed of a winding mechanism between the time when said winding mechanism starts the winding of said seat belt and the time when the withdrawn amount reaches said first reference value, setting the winding speed to said second speed when the withdrawn amount reaches said first reference value, and stopping the winding when the withdrawn amount becomes lower than said second reference value.

14. A computer program for making a computer, for controlling a winding mechanism for winding a seat belt, carry out:
  a step of taking in an index indicating the body size of an occupant to set a reference value of a predetermined parameter which varies according to the winding of said seat belt based on the index,
  a step of controlling said winding mechanism to wind up said seat belt at a first speed until said predetermined parameter varying according to the winding of said seat belt reaches said reference value obtained based on the detected index, and
  a step of controlling said winding mechanism to wind up said seat belt at a second speed lower than said first speed after said predetermined parameter reaches said reference value.

15. A seat belt system, comprising:
  a fixing member for fixing an end of a seat belt;
  a seat belt winding mechanism which is connected to the other end of said seat belt to wind up said seat belt;
  a driving device for driving said seat belt winding mechanism to wind up said seat belt;
  an engaging member through which said seat belt is inserted and is slidably supported;
  a buckle which is disposed on a side opposite to said fixing member relative to a seat and is engaged with said engaging member;
  a guide member which is located above said fixing member, through which said seat belt is inserted, and which supports slidably said seat belt, and
  a computer for inputting an index indicating the body size of an occupant, sets a reference value of a predetermined parameter, which varies according to the winding of said seat belt, based on the index, controlling said driving device to wind up said seat belt at a first speed until said predetermined parameter which varies according to the winding of said seat belt reaches said reference value which was set based on the detected index, and controlling said driving device to wind up said seat belt at a second speed lower than said first speed after said predetermined parameter reaches said reference value.

* * * * *